M. L. POULTER.
CLUTCH.
APPLICATION FILED OCT. 15, 1909.
970,548.
Patented Sept. 20, 1910.
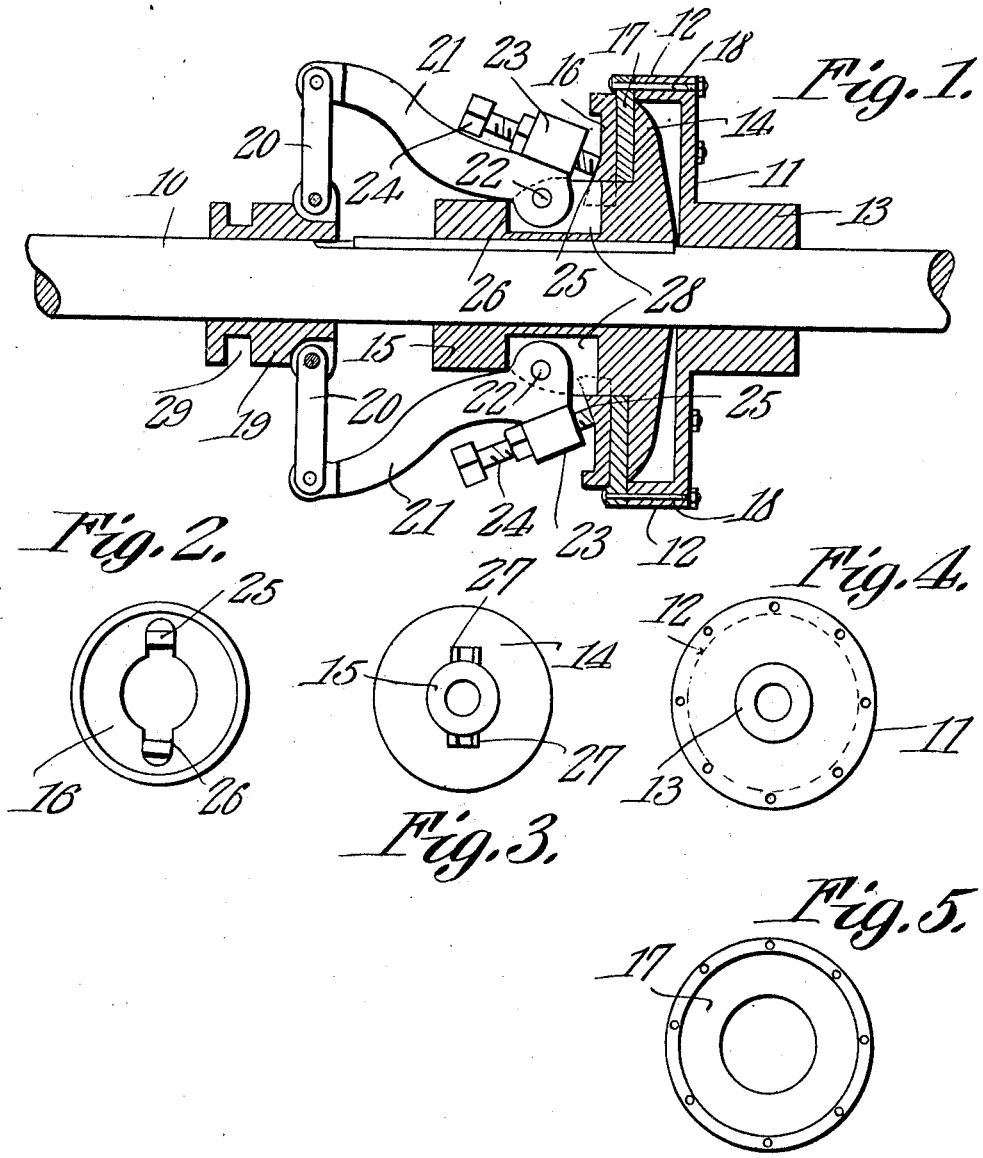

UNITED STATES PATENT OFFICE.

MICAJAH L. POULTER, OF STOCKPORT, IOWA.

CLUTCH.

970,548.  Specification of Letters Patent.  Patented Sept. 20, 1910.

Application filed October 15, 1909. Serial No. 522,795.

*To all whom it may concern:*

Be it known that I, MICAJAH L. POULTER, a citizen of the United States, residing at Stockport, in the county of Van Buren and State of Iowa, have invented a new and useful Clutch, of which the following is a specification.

The present invention has for its object to provide a friction clutch which is simple in structure, and compact in form so that it will occupy but little space on the shaft, and also one which is reliable in operation, and which will start and stop the driven elements without jerks.

With these objects in view the invention consists in a novel construction and arrangement of parts to be hereinafter described and claimed, reference being had to the drawing hereto annexed in which, Figure 1, is a longitudinal section of the mechanism. Figs. 2 to 5 are face views of certain portions of the mechanism detached.

In the drawing 10 denotes a driving shaft on which is loosely mounted a driven member comprising a disk 11 having at its periphery on one side, a laterally presented flange 12. On the other side, the disk is formed with a hub extension 13, to which may be secured a pulley, sprocket wheel, toothed gear or other device for transmitting the motion of the disk. On the shaft 10 is also mounted a disk 14 having a hub extension 15 on one side. This disk is splined on the shaft so that it may turn therewith and also be slid lengthwise thereon. The disk faces that side of the disk 11 from which the flange 12 projects, and is located in the space inclosed by said flange.

On the hub 15 is mounted a disk 16 which faces one side of a friction plate 17 carried by the flange 12, said plate being rigidly secured to the outer edge of the flange by bolts 18. The other side of the plate faces the disk 14, and the plate also has a central opening through which the hub 15 loosely extends.

Slidably mounted on the shaft 10 is a clutch collar 19 to which are pivotally connected, at diametrically opposite points, links 20 pivotally connected to one of the arms 21 of angle levers fulcrumed on the hub 15 at 22. The other arms 23 of the levers carry set screws 24 which engage lugs 25 on the disk 16 adjacent to the opening therein through which the hub 15 extends. The surface of the lugs against which set screws bear is beveled to extend at a right angle to the axes of the set screws so that they will come squarely against the beveled surface. The lugs are on the outer side of the disk 16, the other side facing the plate 17.

The wall of the opening in the disk 16 through which the hub 15 extends has at diametrically opposite points, notches 26 which are entered by ribs 27 on said hub whereby the disk is locked to the hub and made to rotate therewith. There are two of these ribs on the hub at diametrically opposite points, the angle levers being fulcrumed between the same. Between the members of the respective pairs of ribs, the hub is formed with a recess 28 to permit free play of the levers.

The collar 19 has an annular groove 29 for connection of the usual clutch lever (not shown), whereby the collar is shifted back and forth on the shaft to apply or release the clutch.

In operation, when the collar 19 is moved toward the friction devices, the angle levers are rocked on their fulcrums, and the set screws 21 advance the disk 16 into frictional engagement with one face of the plate 17, and at the same time, the disk 14 is advanced into frictional engagement with the other face of the plate, the angle levers providing a connection between the collar 19 and disk 14 so that said parts move together when the collar is shifted on the shaft, and as the disk 16 rotates with the shaft, the disk 11 will now turn with the shaft. Upon shifting the collar 19 away from the friction devices, the parts move in the opposite direction, and the disks 14 and 16 release the plate 17, so that the disk 11 may remain stationary on the shaft.

What is claimed is:

The combination of a shaft, a member loose thereon and carrying a friction plate, a disk slidable on and rotatable with the shaft, said disk being located on one side of the plate, and having a hub extension, a disk on said hub extension, and held against rotation thereon, said disk being located on the other side of the plate, angle levers carried by the hub extension, a collar slidably mounted on the shaft, a link connecting one of the arms of each of said levers to the collar, set screws threaded through the other arms of the levers, and lugs on the second-mentioned disk having beveled surfaces which are engageable by the set screws for advancing said disk into frictional engagement with the plate, simultaneously with the corresponding movement of the first-mentioned disk, said beveled surfaces extending at a right angle to the axes of the set screws.

In testimony that I claim the foregoing as my own, I have hereto affixed my signature in the presence of two witnesses.

MICAJAH L. POULTER.

Witnesses:
  CHESTER HARLAN,
  O. A. COLLINS.